United States Patent Office 3,373,341
Patented Mar. 12, 1968

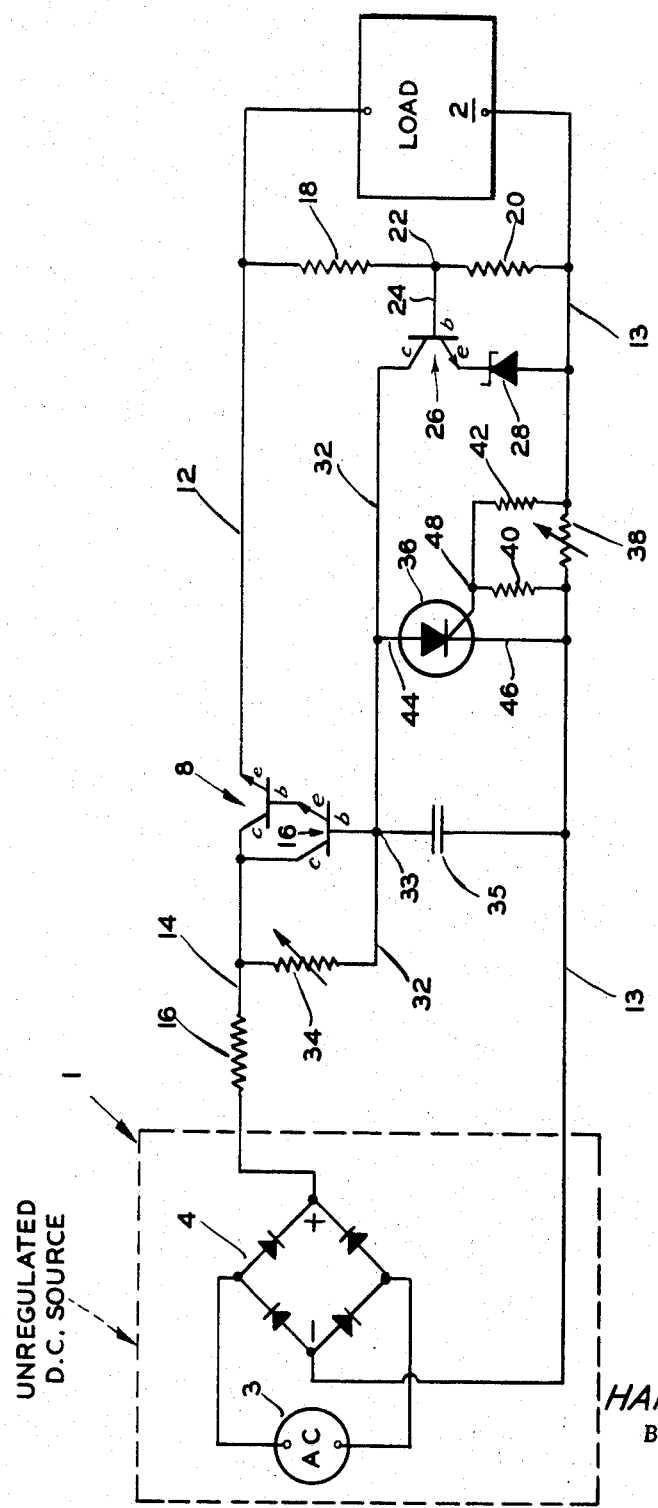

3,373,341
ELECTRICAL NETWORK FOR PREVENTING EXCESSIVE LOAD CURRENT
Harry B. Wattson, Rutherford, N.J., assignor to The Bendix Corporation, Teterboro, N.J., a corporation of Delaware
Filed May 18, 1964, Ser. No. 368,264
8 Claims. (Cl. 323—9)

ABSTRACT OF THE DISCLOSURE

An electrical network for preventing excessive current from flowing to a load and including a normally nonconductive silicon controlled rectifier connected across the power supply to the load. When excessive load current develops, the silicon controlled rectifier is rendered conductive which in turn cuts off a regulating transistor to prevent current flow to the load. The silicon controlled rectifier is automatically cut off when the load current returns to normal thereby returning current flow to the load.

---

This invention relates to an overload protection circuit for a direct current voltage regulator.

Briefly, the protection circuit comprises a silicon controlled rectifier switch included in a resistive path connected across the power supply to be regulated. Under normal conditions, the silicon controlled rectifier switch is not conducting and the output from the unregulated power supply is feed through the regulator circuit to the load.

In the event of overload, resulting, for example, when the load terminals are short circuited, the silicon controlled rectifier switch is rendered conductive. In response to the silicon controlled rectifier switch being renedered conductive, a main regulating transistor in the regulator circuitry is cut off thereby preventing an excessive amount of current from flowing through sensitive elements of the regulator circuitry. Current flows through the resistive path which includes the silicon controlled rectifier switch. This resistive path is of high resistance, and thus, the amount of current flowing through the resistive path is low enabling a silicon controlled rectifier of small capacity to be used. The operation of the protection circuit is immediate and automatic preventing any damage to the sensitive elements in the regulator circuit.

The protection circuit further includes a voltage divider for reducing the sensitivity of the silicon controlled rectifier thereby preventing accidental triggering thereof.

While the load current is capable of being reduced to zero during overload, the protection circuit further includes selectively variable means whereby the circuit may be adjusted to provide an output having a sawtooth waveform of constant magnitude during overload. This provides the advantage of automatically returning the regulator circuit to normal operation as soon as load current returns to normal. It may also be useful for providing an actuating signal for an overload indicator.

An object of the present invention is to provide an overload protection circuit capable of operating in microseconds.

Another object of the present invention is to provide an overload protection circuit employing a silicon controlled rectifier switch which need only be capable of handling a minimum of current flow.

Another object of the present invention is to provide an overload protection circuit including means for reducing the sensitivity of the protection circuit so as to preclude accidental triggering thereof.

Another object of the present invention is to provide a protection circuit for a voltage regulator including selectively variable means whereby, in the event of overload, the regulator may be adjusted to provide either no output or an output having a sawtooth waveform.

Another object of the present invention is to provide an overload protection circuit which is compact, simple in construction, reasonably cheap to manufacture, reliable and efficient in operation.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a schematic diagram of an embodiment of the present invention.

Referring to the drawing, there is shown a regulator circuit for supplying current from an unregulated direct current source 1 to a load 2. The direct current source 1 comprises an alternating current supply 3 connected to the input terminals of a full wave bridge rectifier 4.

A main regulating transistor 8 is connected in series with the direct current supply 1 and load 2. Transistor 8 has its emitter connected by conductor 12 to upper side of load 2 and its collector connected by a conductor 14 and resistor 16 to the positive terminal of rectifier 4. Transistor 8 functions as a variable impedance controlling the flow of current to load 2. A conductor 13 connects the lower side of load 2 to the negative terminal of rectifier 4 to complete the circuit.

Transistor 8 is controlled by transistor 16 connected in cascade with transistor 8 so that the combined gain of transistors 8 and 16 is equal to the product of their individual gains. Transistor 16 and in turn transistor 8 is controlled by a feedback signal which is transmitted through a feedback circuit, hereinafter described. The feedback signal is an error signal, representing variations in load, which operates on transistor 16 and in turn on transistor 8 to maintain a constant output voltage across load 2.

The feedback network includes a voltage divider connected in parallel with load 2. The voltage divider comprises resistors 18 and 20. A junction point 22, between resistors 18 and 20, functions as a first point of reference potential. Any variation in the load voltage causes a concurrent and proportional variation in the potential at junction point 22.

A conductor 24 connects junction point 22 to the base of error sensing transistor 26. The emitter of error sensing transistor 26 is connected by zener diode 28 to conductor 13. The zener diode 28 functions to maintain the emitter potential of transistor 26 constant in spite of variations in the amount of current flowing through transistor 26. In this manner, any variation in the base potential of transistor 26, resulting from a change in load voltage, causes a concurrent and proportional change in the base to emitter voltage of transistor 26. In turn, the collector potential of transistor 26 varies proportionally providing an output error voltage proportional to the output voltage variation.

The base of transistor 16 and the collector of transistor 26 are connected together at junction point 33 and from junction point 33 through a common biasing resistor 34 to input lead 14. The error voltage from the collector of transistor 26 is fed through conductor 32 to the base of transistor 16 to control transistor 16, and, in turn, transistor 8.

Capacitor 35 connected between junction point 33 and conductor 13 functions as a bypass capacitor to limit the gain at high frequencies to prevent oscillations. Capacitor 35 also cooperates with an overload protection circuit, hereinafter described, for preventing damage to various sensitive elements of the circuit in the event of overload.

The protection circuit comprises a silicon controlled rectifier 36, a voltage divider comprising resistors 40 and 42, and a variable resistor 38 in series with load 2. A conductor 44 connects the anode of rectifier 36 to conductor 32 and a conductor 46 connects the cathode of rectifier 36 to conductor 13.

Variable resistor 38 is connected in series with load 2 through conductor 13. Resistors 40 and 42, connected in parallel with resistor 38, form a voltage divider and have an intermediate junction point 48. The voltage developed at junction point 48 is applied to the gate electrode of silicon controlled rectifier 36. The resistance of resistor 42 is much greater than the resistance of resistors 38 and 40. The voltage division effected by resistors 38, 40, and 42 reduces the sensitivity of the silicon controlled rectifier switch 36 and prevents accidental triggering thereof prior to the load current reaching triggering level. The firing point for the silicon controlled rectifier 36 may be adjusted by adjusting variable resistance 38.

Operation

Under normal operating conditions, the silicon controlled rectifier 36 is not conducting. The potential at junction point 48 is maintained below the firing level of the silicon controlled rectifier switch 36 and the voltage division effected by resistors 38, 40, and 42 minimizes accidental firing of the protection circuit by transients. Since the rectifier 36 is not conducting, the protection circuit does not interfere in any way with the operation of the voltage regulator circuit.

If the impedance through load 2 decreases, due to a partial short circuit or the like, the current through the load 2 begins to rise. Immediately upon this current reaching a predetermined level, as set by the resistors 38, 40, and 42, the potential at junction point 48 will be sufficient to fire the silicon controlled rectifier switch 36. Immediately, a current flows from the positive terminal of rectifier 4 is fed through variable resistor 34, conductors 32 and 44, the silicon controlled rectifier switch 36, conductor 46, and return lead 13 to the negative terminals of rectifier 4. The potential at junction point 33 is lowered due to the increased voltage drop across resistor 34. As the potential at junction point 33 is reduced, transistors 16 and 8 cut off because the bases of these transistors are made negative relative to their emitters. As a result, no current flows through the sensitive elements of the regulator circuit during overload conditions.

In order to return the regulator circuit to normal operation after short circuit across the load is removed, the silicon controlled rectifier switch 36 must be temporarily short circuited so that it cuts off. In some applications, this may be a troublesome manual operation.

In order to obviate this problem, the protection circuit of the present invention is capable of being adjusted to provide the additional feature of automatically returning the regulator circuit to normal operation. Variable resistor 34 may be adjusted to provide, in the event of overload, a condition where the silicon controlled rectifier 36 is repeatedly turned on and off. This results in a sawtooth waveform across load 2. If the load current returns to normal, the regulator circuit is automatically returned to normal operation.

This mode of operation results from adjusting resistor 34 to provide a very high resistance. The anode to cathode current of the silicon controlled rectifier 36 must be at a predetermined minimum magnitude, hereinafter called holding current, in order for it to conduct. Resistor 34 is adjusted so that the magnitude of current flowing therethrough after the silicon controlled rectifier is fired, is below the holding current value. In the mode of operation previously described, when load current is reduced to zero, resistor 34 was at a value such that the current flowing therethrough during overload was above the holding value.

While the current flowing through resistor 34 is below the holding value, the silicon controlled rectifier switch 36 is nevertheless rendered conductive in response to the voltage at its gate electrode reaching a predetermined magnitude. This is due to the stored charge on capacitor 35. The current from capacitor 35 together with the current through resistor 34 is above the holding value. As soon as the capacitor 35 discharges, however, the anode to cathode current of the silicon controlled rectifier 36 is below the holding value and the silicon controlled rectifier 36 cuts off. Transistor 8 again conducts current to load 2 and capacitor 35 charges. If overload persists, the silicon controlled rectifier 36 immediately fires again. A brief instant later, the silicon controlled rectifier cuts off due to discharge of capacitor 35. This operation is repeated if overload conditions persist resulting in an output having a sawtooth waveform during overload. If load current returns to normal, the silicon controlled rectifier 36 will not fire again thereby returning the regulator circuit to normal operation.

In addition to automatically returning the regulator to normal operation, this mode of operation may be useful for providing a signal for actuating an overload indicator.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An overload protection circuit comprising a supply source, a load, variable impedance means connecting said supply source with said load impedance, a silicon controlled rectifier connected across said supply source, means for firing said silicon controlled rectifier switch in response to the load current reaching a predetermined level, and control means responsive to the firing of said silicon controlled rectifier switch for varying the impedance of said variable impedance means to prevent excessive current flow through said load.

2. Apparatus as defined by claim 1, said control means including variable means for selectively reducing the load current to zero in response to the firing of said silicon controlled rectifier.

3. Apparatus as defined by claim 1, said control means including variable means for selectively providing an output across said load having a sawtooth waveform in response to the firing of said silicon controlled rectifier.

4. Apparatus as defined by claim 1, said means for firing said silicon controlled rectifier including voltage divider means for reducing the sensitivity of said silicon controlled rectifier thereby preventing accidental firing of said silicon controlled rectifier.

5. An overload protection circuit comprising a supply source, a load, first conductor means including variable impedance means connecting one side of said supply source to one side of said load, second conductor means including a series resistor means connecting the other side of said supply source to the other side of said load, a variable resistor, a silicon controlled rectifier switch including a gate electrode, means for serially connecting said variable resistor and said silicon controlled rectifier switch across said supply source, a voltage divider connected across said series resistor, and third conductor means connecting an intermediate point on said voltage divider to said gate electrode.

6. Apparatus as defined by claim 5, including a capacitor connected across said silicon controlled rectifier switch.

7. Apparatus as defined by claim 5, said series resistor means comprising a variable resistor.

8. Apparatus as described by claim 5 including resistor means for connecting the variable impedance means to the one side of the supply source.

References Cited

UNITED STATES PATENTS

| 2,551,407 | 5/1951 | Alder | 323—4 |
| 3,049,632 | 8/1962 | Staples | 307—88.5 |
| 3,192,441 | 6/1965 | Wright | 317—33 |
| 3,218,542 | 11/1965 | Taylor | 323—22 |

JOHN F. COUCH, *Primary Examiner.*

K. D. MOORE, W. E. RAY, *Assistant Examiners.*